(12) United States Patent
Van Der Huizen et al.

(10) Patent No.: US 9,834,625 B2
(45) Date of Patent: Dec. 5, 2017

(54) AMINE-CONTAINING POLYALKENYL COUPLING AGENTS AND POLYMERS PREPARED THEREFROM

(71) Applicant: KRATON POLYMERS U.S. LLC, Houston, TX (US)

(72) Inventors: Adrie A. Van Der Huizen, Castricum (NL); Carl L. Willis, Waller, TX (US)

(73) Assignee: KRATON POLYMERS U.S. LLC, Houston, TX (US)

( * ) Notice: Subject to any disclaimer, the term of this patent is extended or adjusted under 35 U.S.C. 154(b) by 193 days.

(21) Appl. No.: 14/826,724

(22) Filed: Aug. 14, 2015

(65) Prior Publication Data
US 2017/0044291 A1 Feb. 16, 2017

(51) Int. Cl.
  *C08F 257/02* (2006.01)
  *C08F 12/08* (2006.01)
  *C08F 136/08* (2006.01)
  *C08F 212/34* (2006.01)
  *C08F 8/32* (2006.01)

(52) U.S. Cl.
  CPC ............... *C08F 12/08* (2013.01); *C08F 8/32* (2013.01); *C08F 136/08* (2013.01); *C08F 212/34* (2013.01)

(58) Field of Classification Search
  CPC ....................... C08F 257/02; C08F 255/08
  See application file for complete search history.

(56) References Cited

U.S. PATENT DOCUMENTS

| | | |
|---|---|---|
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 3,787,510 A * | 1/1974 | Farrar et al. ............ C07F 1/02 260/665 R |
| 4,316,844 A | 2/1982 | Waitkus et al. |

FOREIGN PATENT DOCUMENTS

WO 2013098113 A2 7/2013

OTHER PUBLICATIONS

Hong, L.; Yang, S.; He, J., "Molecular engineering of branched polymers through 1,1-diphenyl-ethylene chemistry and anionic polymerization", European Polymer Journal, 65 (2015) 171-190.

* cited by examiner

*Primary Examiner* — Mark Kaucher
(74) *Attorney, Agent, or Firm* — Ekatherina Serysheva

(57) ABSTRACT

A coupling agent having at least two alkenylbenzene groups each covalently bonded with a nitrogen of an amine compound. The coupling agent can have the structure I:

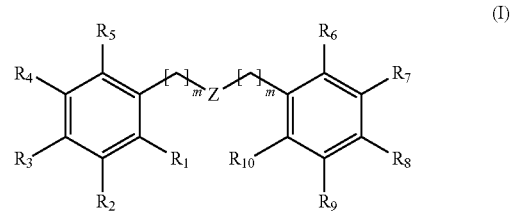

wherein
Z is an amine;
$R_1$-$R_{10}$ are each, independent of one another, H, an organic functional group or a terminal alkene, wherein at least one terminal alkene is on each benzene ring;
m is an integer from 1 to 8.

34 Claims, No Drawings

AMINE-CONTAINING POLYALKENYL COUPLING AGENTS AND POLYMERS PREPARED THEREFROM

TECHNICAL FIELD

The present disclosure generally relates to polymer coupling agents. In particular, the present disclosure is directed to amine-containing poylalkenyl coupling agents and polymers, copolymers, and block copolymers prepared therefrom.

BACKGROUND OF THE INVENTION

Coupling agents are commonly used in polymers prepared by anionic polymerization for the formation of a completed polymer. For example, in the formation of polymers, copolymers, and block polymers a first polymer segment or polymerized portion can be prepared, and rather than completing the formation of the polymer via sequential polymerization, a coupling agent can be provided which "couples" the prepared segments together. Multifunctional coupling agents have been used, for example, including silicon halides, polyepoxides, polyisocyanates, polyketones, polyanhydrides, dicarboxylic acid esters. Additionally, divinylbenzene ("DVB") is a known polyalkenyl coupling agent, and has been used for the preparation of conjugated diene polymers, i.e., styrenic block copolymers as well as polymers of conjugated dienes.

Coupling agents should be sufficiently reactive to couple at least two living polymer arms (same or different) to form a coupled polymer. The coupled polymer can form a linear polymer. Additional arms may also form, e.g., where the coupling agent forms a core onto which a large number of living polymer arms are attached, thus forming a multi-armed polymer. Further, during any such reaction some of the polymer arms may fail to couple, thus causing a portion of the polymer to be coupled and a remaining portion uncoupled.

SUMMARY OF THE INVENTION

Disclosed herein are amine-containing polyalkenyl coupling agents that can be used in the preparation of polymers, copolymers and block copolymers.

In a first aspect, the present disclosure pertains to a process for coupling a polymer comprising:
polymerizing a monomer or a mixture of monomers to form two or more polymer segments; and
reacting the polymer segments with a coupling agent, the coupling agent having at least two alkenylbenzene groups each covalently bonded with a nitrogen of an amine compound.

In a second aspect, the present disclosure pertains to the process for coupling a polymer in accordance with the first aspect, wherein the coupling agent has the structure I:

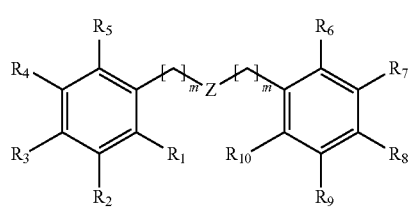

wherein
Z is an amine;
$R_1$-$R_{10}$ are each, independent of one another, H, an organic functional group, or a terminal alkene, wherein at least one terminal alkene is on each benzene ring; and
m is an integer from 1 to 8,
wherein the process further comprises terminating the polymerization if any living polymer segments remain after reacting with the coupling agent.

In a third aspect, the present disclosure pertains to a polymer including a residue of a coupling agent, the coupling agent, prior to coupling, having at least two alkenylbenzene groups each covalently bonded with a nitrogen of an amine compound.

In a fourth aspect, the present disclosure pertains to a process for forming a polymer comprising:
reacting a coupling agent, having at least two alkenylbenzene groups each covalently bonded with a nitrogen of an amine compound, with an initiator to form a living coupling agent with a reactive polymerization site;
reacting the reactive polymerization site with a monomer or mixtures of monomers; and
polymerizing the monomer or mixtures of monomers to form polymer segments extending from the coupling agent.

In a fifth aspect, the present disclosure pertains to a process in accordance with the fourth aspect, wherein the coupling agent has the structure I:

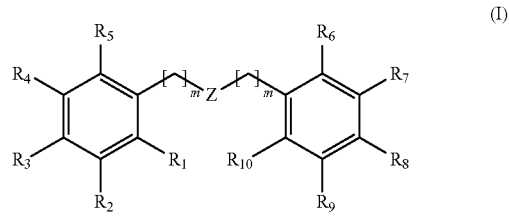

wherein
Z is an amine;
$R_1$-$R_{10}$ are each, independent of one another, H, an organic functional group, or a terminal alkene, wherein at least one terminal alkene is on each benzene ring; and
m is an integer from 1 to 8,
wherein the process further comprises terminating the polymerization if any living polymer segments remain after polymerization.

DETAILED DESCRIPTION OF THE INVENTION

The present disclosure may be understood more readily by reference to the following detailed description as well as to the examples included therein. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein.

The term "polymer" herein includes homopolymers, copolymers, and block copolymers. The term "polymer unit" as used herein refers to the unit of a polymer chain which is formed by, and corresponds to, one monomer. Thus "monomer" or "monomer unit," as used herein, can refer to the individual monomer or polymerized monomer in a polymer chain. The term "segment," as used herein with respect to polymers, refers to any partially or fully polymerized portion of a polymer.

As used herein, the term "molecular weights" refers to polystyrene equivalent, or apparent, molecular weight in g/mol of the polymer or block of the copolymer. The molecular weights referred to in this specification and claims can be measured with gel permeation chromatography (GPC) using polystyrene calibration standards, such as is done according to ASTM D5296. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also referred to as apparent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace and are commonly referred to as "peak molecular weights".

With respect to all ranges disclosed herein, such ranges are intended to include any combination of the mentioned upper and lower limits even if the particular combination is not specifically listed.

Disclosed herein are amine-containing polyalkenyl coupling agents that can be used in the preparation of polymers, copolymers and block copolymers. For example, a polymer segment can be formed initially, for example, via anionic polymerization. Thereafter, the amine-containing polyalkenyl coupling agents can be used to couple the polymer segments to form a completed polymer, segment or copolymer block. Accordingly, a polymer can be formed via anionic polymerization with a coupling agent having an amine functionality.

The amine-containing polyalkenyl coupling agents can be used to couple various polymer segments, for example, including those formed from conjugated dienes, such as butadiene or isoprene, monoalkenyl arenes, such as styrene, as well as other monomers. The term coupling agent as used herein is inclusive of and encompasses linking agents, and includes any agent or compound which directly or indirectly links or couples polymer segments together, whether included in one portion of the coupled or linked polymer or dispersed throughout, and is different than the monomer or polymer segments which are coupled.

The amine-containing polyalkenyl coupling agents, as disclosed herein, have surprisingly beneficial properties. For example, the presence of the amine functionality itself in a formed block copolymer can be useful. Moreover, the coupling agents have surprisingly high coupling efficiencies. The coupling efficiencies can be at least 90%, alternatively at least 94%, alternatively at least 95%, alternatively at least 97%, alternatively at least 98%, alternatively at least 99%.

Moreover, the coupling agents disclosed herein can be beneficially employed to couple amine functionalized polymers. As the residue of the coupling agent contains amine it is thus cooperative with the amine chemistry of the coupled amine functionalized segment.

Coupling Agent

The amine-containing polyalkenyl coupling agent disclosed herein includes at least two alkenylbenzene groups each covalently bonded with the nitrogen of a bridging amine compound. The amine-containing polyalkenyl coupling agent can have two alkenylbenzene groups, alternatively three or more alkenylbenzene groups. The amine compound can be cyclic or acyclic and contain one or more nitrogen atoms. The amine compound can include one or more primary or secondary amine moieties prior to covalent bonding with the alkenylbenzene groups. The amine compounds can be alkylamines, arylamines, cyclic or other organic amines. Each alkenylbenzene group can be attached to the same or different nitrogen. For example, when the amine compound contains one nitrogen functionality and two alkenylbenzene groups, both alkenylbenzene groups can be each attached to the same nitrogen. Where there are two or more nitrogen functionalities as well as two alkenylbenzene groups, the two alkenylbenzene groups can be attached to the same or different nitrogen.

The alkenylbenzene groups each have at least one terminal alkenyl group. The terminal alkenyl groups may be vinyl groups. In particular, the alkenylbenzene groups may each have one vinyl group so that each bond to a living polymer segment and therefore couple two living polymer segments together to form a coupled polymer or polymer block. Besides the vinyl functionalities, the alkenylbenzene groups can be otherwise unsubstituted or substituted with other organic functional groups such as alkyl, aryl, or other groups containing N, O, or S.

The coupling agent may have the structure I, shown as follows:

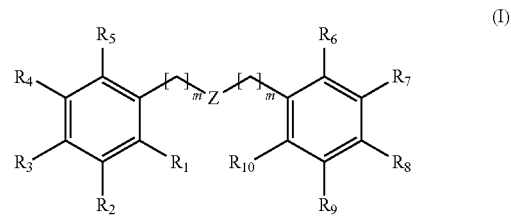

(I)

wherein

Z is an amine, such as an acyclic amine or a cyclic amine;

$R_1$-$R_{10}$ are each, independent of one another, H, an organic functional group or a terminal alkene, wherein at least one terminal alkene is on each benzene ring; and m is an integer from 1 to 8.

With respect to the functional groups $R_1$-$R_{10}$, each can independently of the other be H, an organic functional group or a terminal alkene. At least one of $R_1$-$R_5$ as well as at least one of $R_6$-$R_{10}$ are terminal alkene, thus forming at least one alkenyl group on each of the benzene ring. Additionally, in some cases only one terminal alkene is on each benzene ring. The at least one of $R_1$-$R_5$ and the at least one of $R_6$-$R_{10}$ terminal alkenes can be the same terminal alkene or different terminal alkenes. The terminal alkenes can be for example a $C_2$-$C_8$ terminal alkene. However, in particular examples, the terminal alkene is a vinyl group (ethenyl). Accordingly, each benzene ring can have one vinyl group, or more than one vinyl group. The organic functional group can be a linear or branched alkane, an aryl group, or an ether.

As noted Z above can be an acyclic amine. The acyclic amines can include alkylamines as well as arylamines. The acyclic amine can also be ammonia. With respect to alkylamines, the alkyl component can be branched or linear. The alkylamine can be a $C_2$-$C_{18}$ linear alkylamine, alternatively a $C_2$-$C_8$ linear alkylamine or alternatively n-butylamine, where the alkyl portion is ethyl, propyl, butyl, pentyl, hexyl, heptyl, octyl, whether branched or linear. In a particular example, the alkylamine can be n-butyl amine. Accordingly, a coupling agent with an acyclic alkylamine includes N,N-bis(4-vinylbenzyl)butylamine ("DVBBA"), shown as follows:

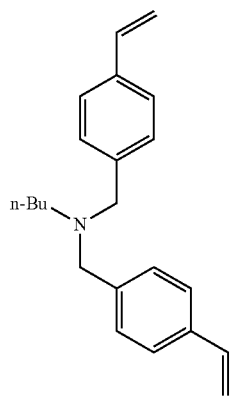

While the shown compound has a 4-vinylbenzyl derivative, the vinyl group can also be in the 2- or 3-position on the benzene ring. Furthermore, while the exemplary embodiment comprises a vinyl terminal alkene, any suitable length of alkene is envisioned wherein the alkene is on the terminal end of the hydrocarbon chain.

As noted, the acyclic amine can be an arylamine. In particular, the benzene ring of the arylamine can be substituted or unsubstituted. For example, it may be substituted with other functional groups organic functional groups such as alkyl, aryl, terminal alkenes or with hetero atoms N, O, or S. These can be provided in the ortho, meta, or para position on the benzene ring or any combinations thereof. The amino functionality and the benzene ring can be separated by a $C_1$-$C_{18}$ linear or branch alkyl chain, alternatively a chain having at least 2 carbons, alternatively at least 4 carbons, alternatively at least 6 carbons, alternatively at least 8 carbons, alternatively at least 10 carbons, alternatively 12 carbons, which may be branched or linear.

In one example the arylamine is a benzylamine, thereby forming the coupling agent N,N-bis(4-vinylbenzyl)benzylamine ("DVBBnA"), shown as follows:

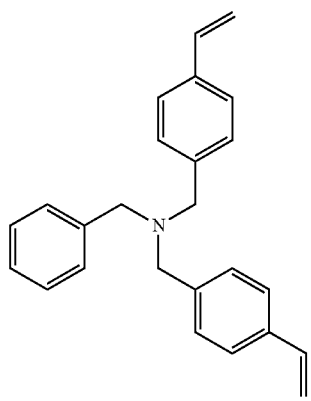 [SMILES: C=Cc1ccc(CN(Cc2ccccc2)Cc2ccc(C=C)cc2)cc1]

The benzylamine can have further organic functional groups in the ortho, meta, or para position on the benzene ring or any combinations thereof. While the shown example above is a 4-vinylbenzyl derivative, the vinyl group can also be in the 2- or 3-position on the benzene ring. Furthermore, any suitable length of alkene is envisioned wherein the alkene is on the terminal end of the hydrocarbon chain.

As described above the amine-containing polyalkenyl coupling agents disclosed herein can include at least two alkenylbenzene groups each covalently bonded with the nitrogen of a bridging amine compound. The amine-containing polyalkenyl coupling agent can have three alkenylbenzene groups covalently bonded with the nitrogen. This may also be defined as Z in structure I being a substituted arylamine. Three alkenylbenzene groups can be bonded to nitrogen to form N,N,N-tris(4-vinylbenzyl)amine as shown below.

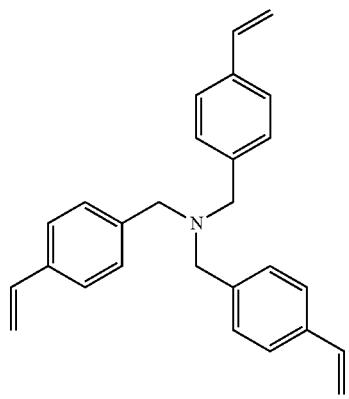 [SMILES: C=Cc1ccc(CN(Cc2ccc(C=C)cc2)Cc2ccc(C=C)cc2)cc1]

While in the shown compound the arylamines are each 4-vinylbenzyl derivatives, the vinyl group can also be in the 2- or 3-position on one or more of the benzene rings. Furthermore, any suitable length of alkene is envisioned wherein the alkene is on the terminal end of the hydrocarbon chain.

As previously noted, Z in formula I can be a cyclic amine. The cyclic amine can include two or more nitrogen functionalities. For example, the cyclic amine can include two amines within the ring wherein the nitrogen of each amine couples to a polymer arm via an alkyl linkage. The cyclic amine can be any hydrocarbon ring having at least two secondary amines in the ring. The cyclic amine can be fully saturated, alternatively partially saturated, or alternatively unsaturated and can include other heteroatoms such as O or S. The cyclic amines can include, for example, piperazine, pyridazine, pyrimidine, pyrazine, 1,3,5-triazinane, purine, or substituted equivalents thereof. The exemplary cyclic amines are not meant to be limiting in any way, as one of ordinary skill in the art will appreciate that other cyclic multi-amines can be used without departing from the present disclosure.

The cyclic amine can be piperazine, and therefore form 1,4-bis (4-vinylbenzyl)piperazine ("DVBP"), shown as follows:

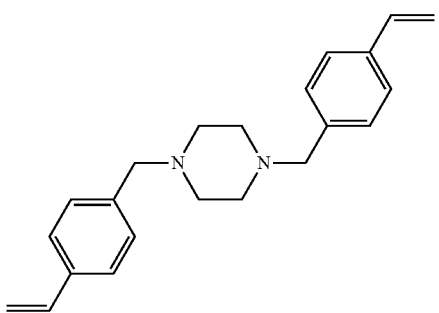 [SMILES: C=Cc1ccc(CN2CCN(Cc3ccc(C=C)cc3)CC2)cc1]

While the shown compound has a 4-vinylbenzyl derivative, the vinyl group can also be in the 2- or 3-position on the benzene ring. Furthermore, any suitable length of alkene is envisioned wherein the alkene is on the terminal end of the hydrocarbon chain.

The disclosed coupling agent is described with particular examples DVBBA, DVBBnA, DVBP, and N,N,N-tris(4-vinylbenzyl)amine it is noted that the present disclosure is not limited to these but encompasses any amine-containing polyalkenylbenzene.

As shown in formula I, the alkenyl benzene groups are attached to the amine via an alkyl bridge m, which may be a chain from 1 to 8 carbons. Bridging groups can include for example $C_2$-$C_5$ alkyl, such as ethyl, propyl, butyl, or pentyl. In a particular example, m is 1, thus making the group a methylene bridging group.

Coupling Agent Residue

A coupled (co)polymer is also provided herein which is formed as a result of coupling, thereby leaving a residual amount of the amine-containing polyalkenyl coupling agent within the formed polymer.

The residual coupling agent X can be an amino-functionalized benzylalkane compound having the structure II, shown as follows

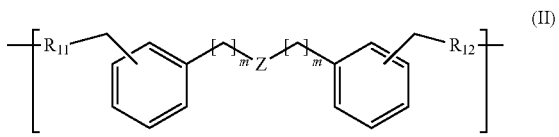

wherein

Z is an amine, such as an acyclic amine or a cyclic amine, having the definitions described above;

$R_{11}$ and $R_{12}$ are $C_1$-$C_7$ alkyl chains;

the remaining positions of each benzene ring may be substituted with one or more of H or organic functional group; and m is an integer from 1 to 8.

Z as well as the cyclic or acyclic amines in structure II are the same as described above with respect to structure I. As noted, $R_{11}$ and $R_{12}$ are substituted or unsubstituted alkanes. These groups form as a result of the terminal alkene reacting with the polymer chain during the coupling process thus forming the linkage the coupled polymer segments.

The $R_{11}$ and $R_{12}$ above coupling agent according to formula II provide alkane linkage to from the coupling agent to the remainder of the polymer. The $R_{11}$ and $R_{12}$ alkanes are formed as a result of the terminal alkene reacting with the polymer chain during the coupling process thus forming the linkage to the coupled polymer. The $R_{11}$ and $R_{12}$ can be positioned at the meta, ortho, or para positions of each benzene ring. The remaining four positions of each benzene ring can be one or more of H or an organic functional group, for example a linear or branched alkane, an aryl group, or an ether.

The integer m is the same as described with respect to formula I.

The polymer formed having the residue structure II can formed from the anionic polymerization of any monomer. Specific examples of monomers include conjugated dienes and monoalkenyl arenes. Exemplary suitable conjugated dienes include butadiene, 1,3-butadiene, 1,2-butadiene, isoprene, 1,3-pentadiene (pip erylene), 2,3-dimethyl-1,3-butadiene, 3-butyl-1,3-octadiene, 1-phenyl-1,3-butadiene, 1,3-hexadiene, and 4-ethyl-1,3-hexadiene and mixtures thereof, with butadiene and/or isoprene in particular. Exemplary monoalkenyl arene compounds include the monovinyl aromatic compounds such as styrene, monovinylnaphthalene as well as the alkylated derivatives thereof such as o-, m- and p-methylstyrene, alpha-methylstyrene and tertiary-butylstyrene.

If a monoalkenyl arene compound is used in the preparation of the polymers disclosed herein, the amount thereof can be 70% or less by weight. More in particular, if the monoalkenyl arene compound is polymerized in blocks, the block or blocks of poly(monoalkenyl arene) in the final coupled polymer preferably comprise no more than 50% by weight, or no more than 35% by weight on the weight of the coupled polymer.

Other monomers include amine functionalized styrene monomers, including vinyl benzylamines. These include for example p-vinylbenzylpiperidine, p-vinylbenzylmorpholine, p-vinylbenzyldimethylamine , p-vinylbenzylpyrrolidine, p-vinylbenzyl-bis-(2-methoxyethyl)amine, p-vinylbenzylpiperazine, p-dibenzylvinylbenzylamine, and mixtures thereof.

The polymer segments or blocks can include mixtures of the above mentioned monomers, for example conjugated diene and styrene mixed blocks. These can be for example random copolymers, tapered or controlled distribution copolymers.

Subsequent coupling, the coupling agent residue according to formula II is present in a polymer having:
  (a) a block A;
  (b) a block A'; and
  (c) the coupling agent residue of formula II.
wherein the coupling agent couples at least one of block A or block A', or couples block A to block A'.

The blocks A and A' can be the same or different and can be prepared from or include segments from any monomer. The monomers A and A' can be made from any of the aforementioned hydrocarbon monomers.

In some examples, blocks A and A' may have a number average molecular weight of from about 1,000 to about 160,000. In alternative examples blocks A and A' have a number average molecular weight of from about 1,000 to about 120,000, alternatively from about 1,000 to about 80,000, alternatively, from about 1,000 to about 40,000, or alternatively from about 1,000 to about 20,000. Blocks A and A' can be synthesized to have approximately the same number average molecular weight or different number average molecular weights.

In some examples, the polymer is defined by a general configuration A-X-A', A-X-A'-X-A, A'-X-A-X-A', (A-A')nX, (A-A'-A)$_n$X, (A'-A-A')$_n$X or mixtures thereof, wherein X is the coupling agent residue of formula II, n is an integer from 2 to about 30, alternatively from 3 to 30, and wherein the plurality of blocks A and blocks A' are the same or different. The amine-containing polyalkenyl coupling agent disclosed herein is capable of producing star branched polymers, wherein n is 3 or more, or alternatively from 3 to 30. The coupling can produce highly star branched compositions with relatively low levels of linear coupling, i.e. where n is 2, or where n is 2-3.

Although the structure II shows two linkages to a polymer chain, the structure can be adapted to include three linkages as well. For example, as discussed previously, a coupling agent can include N,N,N-tris(4-vinylbenzyl)amine, which upon conversion of the three terminal alkenyl groups would form a residue of a that structure having three polymer chain linkages.

After coupling is complete, the polymer can undergo hydrogenation, such that at least 50% of the olefinic unsaturation of the polymer arms are hydrogenated, alternatively at least 80% of the olefinic unsaturation of the polymer arms are hydrogenated, alternatively, at least 90% of the olefinic unsaturation of the polymer arms are hydrogenated.

Process for Anionic Polymerization and Coupling

The coupling agent as disclosed herein can be used for preparing a coupled polymer prepared in part by anionic polymerization. The coupled polymer can include for example conjugated diene, styrene, or can be a copolymer of conjugated diene and styrene, in the same or different blocks, as well as other polymer units. An exemplary process includes the following reaction steps:
 a) polymerizing a monomer or a mixture of monomers, for example at least one conjugated diene and one or more monoalkenyl arene compounds in the presence of an anionic initiator to form a living polymer arm or mixture of arms;
 b) reacting the living polymer arm or arms with an amine-containing polyalkenyl coupling agent,
 c) terminating the polymerization if any living polymers remain after step b), and
 d) optionally functionalizing and/or hydrogenating the coupled polymer so produced.

The process can utilize an amine-containing polyalkenyl coupling agent having the structure I as described above. These include for example the particular coupling agents DVBBA, DVBBnA, DVBP, or N,N,N-tris(vinylbenzyl)amine and their derivatives.

In order to begin the coupling process, living polymers may be prepared by anionic solution polymerization of monomer units to form initial polymer segments or blocks in the presence of an initiator. For example, conjugated dienes and monoalkenyl arene compounds can be polymerized in the presence of an anionic initiator such as an alkali metal or an alkali-metal hydrocarbon, e.g. sodium naphthalene. An example of an initiator is lithium or a monolithium hydrocarbon. Many lithium hydrocarbons known in the art are suitable, wherein the hydrocarbon may contain from 1 to 40 carbon atoms and in which lithium has replaced one or more hydrogen atoms. It should be understood that in addition to monovalent lithium compounds such as alkyl lithium compounds, also dilithium and polylithium compounds may be used, as well as mixtures of hydrocarbon lithium compounds. Particularly advantageous are for instance alkyl lithium compounds such as methyl lithium, ethyl lithium, n-butyllithium, s-butyllithium ("s-BuLi"), hexyllithium, 2-ethylhexyllithium, n-hexadecyllithium and the like. A particular example is s-BuLi as sole initiator.

The concentration of the initiator used to prepare the living polymer may vary between wide limits and is determined by the desired molecular weight of the living polymer. For block copolymers, the hydrocarbon lithium based initiator is usually employed in amounts of 10 to 2000 ppm Li, preferably 100 to 1000 ppm Li based on the weight of the monomer or monomer mixture. For conjugated diene polymers, the hydrocarbon lithium based initiator is usually employed in similar concentrations of 10 to 2000 ppm Li, preferably 100 to 1000 ppm Li based on the weight of the diene monomer. The initiators may be added to the polymerization mixture in two or more stages optionally together with additional monomer. The living polymers are olefinically and, optionally, aromatically unsaturated.

The conditions for producing polymers by anionic polymerization in the presence of a lithium-based initiator are well-known in the art. Typically, solvent, initiator and monomer(s) are first made free of chemical impurities, moisture and air, all of which adversely impact the polymerization. The monomer(s) should be at least 90 mole percent (mol %) pure. The purified streams enter a reactor or chain of reactors into which the initiator is injected, and the polymerization begins.

As stated above, the living copolymers may be living block copolymers, living random copolymers or living tapered copolymers. Living block copolymers are made by polymerizing an amount of a first type of monomer to full completion, and then adding an amount of an alternative type of monomer. Thus, the living block copolymers may be prepared by the step-wise anionic polymerization of the monomer types e.g. by polymerizing isoprene monomers to form living polyisoprene followed by the addition of another monomer, e.g. styrene, to form a living block copolymer having the formula polyisoprene-polystyrene-M, or styrene monomers may be polymerized first to form living polystyrene followed by addition of isoprene monomers to form a living block copolymer having the formula polystyrene-polyisoprene-M. The living copolymers may also have a controlled distribution of monomers in the mid-block A, for instance having the formula polystyrene-poly(butadiene/styrene)-M, wherein the relative content of styrene in the poly(butadiene/styrene) copolymer block is low where it is closest to the polystyrene block.

The living random copolymers may be prepared by adding gradually the most reactive monomer type to the polymerization reaction mixture, comprising either the less reactive monomer type or a mixture of the monomer types, in order that the molar ratio of the monomers present in the polymerization mixture are kept at a controlled level. It is also possible to achieve this randomization by gradually adding a mixture of the monomers to be copolymerized to the polymerization mixture. Living random copolymers may also be prepared by carrying out the polymerization in the presence of a so-called randomizer.

Randomizers are polar compounds which do not deactivate the catalyst and bring about a tendency for random copolymerization. Suitable randomizers are tertiary amines, such as trimethylamine, triethylamine, dimethylethylamine, tri-n-propylamine, tri-n-butylamine, dimethylaniline, pyridine, quinoline, N-ethylpiperidine, N-methylmorpholine; thioethers, such as dimethyl sulfide, diethyl sulfide, di-n-propyl sulfide, di-n-butyl sulfide, methyl ethyl sulfide; and in particular ethers, such as dimethyl ether, methyl ethyl ether, diethyl ether, di-n-propyl ether, di-n-butyl ether, di-octyl ether, di-benzyl ether, di-phenyl ether, anisole, 1,2-dimethyloxyethane, o-dimethoxy benzene, and cyclic ethers such as tetrahydrofuran.

Living tapered copolymers are prepared by polymerizing a mixture of monomers and result from the difference in reactivity between the monomers. For example, if monomer A is more reactive than monomer A' then the composition of the copolymer gradually changes from that of nearly pure poly-A to that of nearly pure poly-A'.

For an optimum coupling result with the amine-containing polyalkenyl coupling agent, the living polymer is preferably capped with one or more styrene monomer molecules, e.g., closest to the carbanionic group M. As a result, the styrene monomer is part of the living polymer, located at the end where it will be attached to the coupling agent or core made of two or more coupling agent molecules.

The solvents in which the living polymers are formed are inert liquid solvents such as hydrocarbons e.g. aliphatic hydrocarbons, such as pentane, hexane, heptane, octane, 2-ethylhexane, petroleum ether, nonane, decane, cyclopentane, cyclohexane, methylcyclohexane or aromatic hydrocarbons e.g. benzene, toluene, ethylbenzene, xylenes, diethylbenzenes, propylbenzenes. In general, cyclohexane is a suitable solvent. Mixtures of hydrocarbons e.g. lubricating oils may also be used.

The temperature at which the polymerization is carried out may vary between wide limits such as from −50 to 150° C. Typically, temperatures of 0 to 100° C. for small-scale and up to 150° C. for large-scale operations may be used for reaction times of 3 to 60 hours. Alternatively, the polymerization is carried out from about 20 to about 80° C. The reaction is suitably carried out in an inert atmosphere such as nitrogen or argon and may be carried out under pressure e.g. a pressure of from about 0.5 to about 10 bars. The polymerization can be carried out for a time sufficient to achieve at least 99% conversion of the monomer feed. This may be achieved within about 1 hour or even less.

With polymerization of living polymer blocks or segments thereof, the living polymers produced are then reacted with the amine-containing polyalkenyl coupling agent. The amine-containing polyalkenyl coupling agent should be added to the living polymer after polymerization of the monomers is substantially complete, i.e. the agent should only be added after substantially all of the monomer has been converted to living polymers.

The amount of polyalkenyl coupling agent added may vary between wide limits but preferably at least 0.2 mole is used per mole of unsaturated living polymer. Amounts of from 0.4 to 5 moles, preferably from 0.5 to 4.5 moles are preferred. The amount, which may be added in a single charge or more stages, is usually such so as to convert the living polymers into coupled polymers. The relative percentage of living polymer coupled is the coupling efficiency, which is discussed below.

If more than the stoichiometric amount (i.e., one mole of terminal alkene per equivalent of unsaturated living polymer) of coupling agent is used, then the coupling agent molecules may polymerize to form a core or nucleus of polymerized or even cross-linked coupling agent molecules. It then acts as a multifunctional coupling agent, resulting in a soluble star-shaped polymer. The number of arms may vary considerably but is typically between 4 and 30, alternatively from about 10 to about 20.

As discussed previously, examples of star-shaped homopolymers may be represented by the formula A-x-$A_n$ and of star-shaped copolymers may be represented by the formula (A-A')-x-$(A-A')_n$ wherein n is an integer, usually between 3 and 24, or 3 and 30, and x is the residue, or nucleus formed from the acyclic amine-containing polyalkenyl coupling agents. From the above it can be seen that x is a nucleus formed from acyclic amines such as DVBBA or DVBBnA, or cyclic amines such as DVBP. Also more complex star-shaped polymers can be made.

In an alternate process, the coupling agent may be used to functionalize a polymer. For example, when the amount of couple agent added such that the amount of terminal alkene is about or greater than 1.0 mole per equivalent of unsaturated living polymer there is a possibility to form adducts such that alkenylbenzylic functionalized (i.e. terminal alkenes) remain unreacted in the final product. This will form a polymer with a terminal functionality. This functionality can be preserved in the final product as a functional group or applied in subsequent chemical reactions with anionic, radical or other reactive moieties. In the cases of functionalization, the molar ratio of terminal alkene to unsaturated living polymer is preferred to be about or greater than 1.0. Ratios greater than 1.0 can be used to minimize any coupling and maximize functionalization.

The coupling of the living copolymers with the amine-containing coupling agent may be carried out in the same solvent as for the polymerization reaction which forms of the living copolymers. A list of suitable solvents is given above. The temperature for the coupling reaction may also vary between wide limits e.g. from 0 to 150° C., alternatively from 20 to 120° C., alternatively from 50 to 80° C., or alternatively from 60 to 70° C. The reaction may also take place in an inert atmosphere such as, for example, nitrogen or argon, and under pressure e.g. a pressure of from 0.5 to 10 bars.

The coupling agent does not necessarily terminate the reaction. The polymers produced in reacting the living polymer arm or arms with an amine-containing polyalkenyl coupling agent may still be "living". If such is the case, then they may be deactivated or "killed", in any known manner such as, by the addition of a compound which reacts with the carbanionic end group. As examples of suitable deactivators may be mentioned, compounds with one or more active hydrogen atoms such as water, alcohols (e.g. methanol, ethanol, isopropanol, 2-ethylhexanol) or carboxylic acids (e.g. acetic acid), compounds with one active halogen atom, e.g. a chlorine atom (e.g. benzyl chloride, chloromethane), compounds with one ester group and carbon dioxide. If not deactivated in this way, the living polymers may be killed by functionalizing and/or hydrogenating the coupled polymer so produced.

However, before being killed, the living polymers may be reacted with further amounts of monomers such as the same or different monomers, for example the dienes and/or monoalkenyl arene compounds of the types discussed above. This is of particular of interest to star-shaped polymers. The effect of this additional step, apart from increasing the number of polymer chains, is to produce a living star-shaped polymer having at least two different types of polymer chains.

This is therefore an alternative to using a mixture of living polymers prior to coupling. For example, a living star-shaped polymer derived from living polyisoprene may be reacted with further isoprene monomers to produce a further living star-shaped polymer having polyisoprene chains of different number average molecular weights. Alternatively, the living star-shaped polyisoprene homopolymer may be reacted with styrene monomers to produce a further living star-shaped copolymer having both polyisoprene and polystyrene homopolymer chains. Thus it can be seen that, by different polymer chains, chains of different molecular weights and/or chains of different structures is envisioned. These further polymerizations may take place under substantially the same conditions as described for the polymerization to form the living polymers. The additional chains may be homopolymer, copolymer chains etc., as described above.

In another exemplary method, an amount of any of the coupling agents described herein can be reacted with an initiator, such as the lithium compounds described herein, to form a living anionic coupling agent. Monomer units, such as, for example, isoprene or butadiene, can then be added to the reaction mixture which will react with the anionic coupling agent species, substantially as described above, to form the living star-branched polymers. The living star-branched polymers may then be terminated or "killed" as described above to stop the polymerization process to form the final star-branched polymer product. This method can be referred to as an "inside-out" method because polymerization begins with the coupling agents and is followed by monomer addition rather initial formation living polymer arms from monomer units followed by addition of coupling agent.

As disclosed herein, the term molecular weight refers to polystyrene equivalent, or apparent, molecular weight of the polymer or block of the copolymer, measured with gel permeation chromatography (GPC) using polystyrene calibration standards, such as is done according to ASTM 05296-11. GPC is a well-known method wherein polymers are separated according to molecular size, the largest molecule eluting first. The chromatograph is calibrated using commercially available polystyrene molar mass standards. The detector used is preferably a combination ultraviolet and refractive index detector. The molecular weight expressed herein is expressed as number average molecular weight ($M_n$) or weight average molecular weight ($M_w$). The molecular weight distribution (D) is expressed as the ratio of $M_w$ over $M_n$. The ratio of the $M_n$ for a coupled polymer over the $M_n$ of the uncoupled precursor polymer is indicated as apparent degree of branching (DoB). This apparent degree of branching is in general lower than the "real" number of polymer arms, as the GPC method separates on the basis of molecular size as indicated above. The DoB values shown in Table 1, are therefore lower than the "real" number of polymer arms.

The amine functionality of the coupling agent disclosed herein may be quaternized subsequent to coupling. The amine containing coupled polymers as disclosed herein may be converted to corresponding onium salts prior to or subsequent formation into a membrane or resin. The quaternization can be carried out with any counter anion, which may include, for example, a halide, such as F, Cl, Br, or I. While halides are mentioned as exemplary counter ions, one of ordinary will appreciate that there are numerous types of counter ions can be used.

Process for Hydrogenation of Formed Polymers, Block Polymers, and Block Copolymers The polymers according to the present disclosure may optionally be hydrogenated. Such cases include when there are diene polymer units in the formed polymer. Hydrogenation can result in improved stability.

The hydrogenation can be conducted in a solvent which is inert during the hydrogenation reaction. Saturated hydrocarbons and mixtures of saturated hydrocarbons are very suitable and it can be advantageous to carry out the hydrogenation in the same solvent in which the polymerization has been effected.

Hydrogenation can be carried out via any of the several hydrogenation or selective hydrogenation processes known in the art. For example, such hydrogenation has been accomplished using methods such as those taught in, for example, U.S. Pat. Nos. 3,595,942, 3,634,549, 3,670,054, 3,700,633, and U.S. Pat. No. Re. 27,145. These methods operate to hydrogenate polymers containing ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 70%, alternatively at least 80%, alternatively at least 90%, alternatively at least 95%, alternatively at least 98% of the conjugated diene double bonds are reduced.

Properties

The coupling agents as disclosed herein provide advantageous coupling properties. For example, coupling efficiencies can be 90%, alternatively at least 94%, alternatively at least 95%, alternatively at least 97%, alternatively at least 98%, alternatively at least 99%. The amine-containing polyalkenyl coupling agents have also been found to result in a high degree of branching. For example, there will be less than 5% linear arms, alternatively less than 3% linear arms, alternatively, less than 1% linear arms. Linear here means for example, a configuration such as $(A-A')_nX$ that n is 2.

Further the coupling agent as disclosed herein provides polymers having a lower polydispersity index ($M_w/M_n$). For example, the polydispersity index can be less than 1.5, alternatively less than 1.25, alternatively less than 1.15, alternatively less than 1.10.

Applications

The amine-containing polyalkenyl coupling agents have been found to result in the formation of star-branched polymers, block polymers, and block copolymers for use as viscosity index (VI) improvers for use in engine oils, gear oils, automatic transmission fluids, power steering fluids, greases and similar hydraulic fluids. Further, the polymers formed with the coupling agents disclosed herein may exhibit low polydispersity indexes. The amine-containing polymers or copolymers described herein may also have utility as dispersants and emulsifiers.

These amine-containing coupled polymers described herein, as well as their quaternized forms, can be employed in a variety of applications and end uses. For example, resins or membranes formed with the amine-containing coupled polymers can be used as anion exchangers in water treatment and softening applications. The amine-containing coupled polymers may be used in electrochemical applications, such as in fuel cells or redox flow cells(separator phase), anion exchange membranes for fuel cells and redox flow cells, dispersions of metal impregnated carbon particles in polymer cement for use in electrode assemblies, including those for fuel cells, water electrolyzers (electrolyte), acid batteries (electrolyte separator), super capacitors (electrolyte), separation cell (electrolyte barrier) for metal recovery processes, sensors (particularly for sensing humidity) and the like. The amine-containing coupled polymers are also used as pervaporation or desalination membranes, and in coatings on porous membranes. They may be useful for gas separation applications.

Additionally, the amine-containing coupled polymers may be used in protective clothing and breathable fabric applications where the membranes, coated fabrics, and fabric laminates could provide a barrier of protection from various environmental elements (wind, rain, snow, chemical agents, biological agents) while offering a level of comfort as a result of their ability to rapidly transfer water from one side of the membrane or fabric to the other, e.g., allowing moisture from perspiration to escape from the surface of the skin of the wearer to the outside of the membrane or fabric and vice versa. Full enclosure suits made from such membranes and fabrics may protect first responders at the scene of an emergency where exposure to smoke, a chemical spill, or various chemical or biological agents are a possibility. Similar needs arise in medical applications, particularly surgery, where exposure to biological hazards is a risk. Surgical gloves and drapes fabricated from these types of membranes are other applications that could be useful in a medical environment.

Accordingly, in some examples, the amine-containing polymers can be included in membranes which may be useful in fuel cells, filtration devices, devices for controlling humidity, devices for forward electro-dialysis, devices for reverse electro-dialysis, devices for pressure retarded osmosis, devices for forward osmosis, devices for reverse osmosis, devices for selectively adding water, devices for selectively removing water, devices for capacitive deionization, devices for molecular filtration, devices for removing salt from water, devices for treating produced water from hydraulic fracturing applications, devices for ion transport applications, devices for softening water, and batteries.

The amine-containing coupled polymers are particularly advantageously employed in a membrane for an electro-deionization assembly which comprises at least one anode, at least one cathode, and one or more membranes. Electro-deionization assemblies include, in particular, desalination cells.

The membranes comprising the amine-containing coupled polymers may be included in anionic membranes. The anionic membranes may advantageously be paired with at least one cationic membrane.

EXAMPLES

The Amine containing coupling agents used in the following examples were purchased from Shepherd Chem. Co. USA. Coupling efficiency (CE) is defined as the proportion of polymer chains which were living, P-Li, at the time any one of the above coupling agents were added that are linked via the residue of the coupling agent at the completion of the coupling reaction. Gel Permeation Chromatography (GPC) data is used to calculate the coupling efficiency of a polymer product. These GPC determinations were carried out using polystyrene calibration standards, in accordance to ASTM 05296-11. The sum of the areas under the GPC curve for all the coupled species is divided by the sum of the areas for all of the coupled moieties plus the area under the curve far the starting, uncoupled polymer species. This ratio is multiplied by 100 to convert the coupling efficiency into a percentage value. In the same way, the linear coupled percentage (LC) is calculated from the ratio of the area under the curve for the linear species and the area for all the coupled species. The apparent degree of branching (DoB) is the ratio between the number average molecular weight of the coupled species and the number average molecular weight of the uncoupled starting product. The peak ratio is correlative to the degree of branching. Generally, the higher the peak ratio, the higher the DoB. As stated above, the apparent degree of branching is in general lower than the "real" number of polymer arms, as the GPC method separates on the basis of molecular size as indicated above. The DoB values shown in Table 1, are therefore lower than the "real" number of polymer arms, and therefore may be considered a reliable approximation.

Example 1

Polyisoprenes (PI, Experiments 1-6)

In a 1 L stirred reactor under nitrogen atmosphere were subsequently added 750 ml of dry deoxygenated cyclohexane, 50 g of isoprene and an appropriate amount of s-BuLi in cyclohexane as a 0.3 M solution at 60° C. in order to target the required molecular weight. After completion of the isoprene conversion into polyisoprene, a 1.0 M solution of either divinylbenzene ("DVB") in dry cyclohexane (Ex. 6, comparative), or similar solutions of DVBBnA (Ex. 1), DVBBA (Ex. 2), or DVBP (Ex. 4) was added at once in a quantity as to give a CA:Li molar ratio of 3:1. In experiments 3 and 5, the 0.3M s-BuLi solution was added at 70° C. and solutions of DVBBA and DVBP were used, respectively. During the coupling reaction the temperature of the vessel was raised to 80° C. for 2 h. The resulting polymers were sampled by precipitation in methanol/BHT and subjected to GPC analysis. The results and data obtained from experiments 1-6 are shown in Table 1.

As shown in Table 1, DVVBnA exhibited the highest coupling efficiency (95%) but also exhibited the lowest peak ratio. While DVBBA and DVBP exhibited lower coupling efficiencies than comparative studies using DVB, DVBBA and DVBP exhibited a 25-67% increase in peak ratio over comparative studies using DVB. Also, surprisingly an increase in reaction temperature from 60° C. to 70° C. had a more pronounced effect on the DVBBA experiments than DVBP (increases of 4% and 1% for DVBBA and DVBP respectively).

Also as shown in experiments 2-5 of Table 1, an increase in reaction temperature resulted in lowered polydispersity of the DVBBA polymer samples (Mw/Mn=1.14 at 60° C. versus 1.24 at 70° C.) whereas the same temperature increase had no effect on the DVBP sample (Mw/Mn=1.14 at 60° C. versus 1.24 at 70° C.).

Example 2

Polystyrenes (PS, Experiments 7-12)

In a 1 L stirred reactor under nitrogen atmosphere were subsequently added 750 ml of dry deoxygenated cyclohexane, 50 g of styrene and an appropriate amount of s-Buli in cyclohexane as a 0.3 M solution at 60° C. in order to target the required molecular weight. After completion of the isoprene conversion into polystyrene, a 1.0 M solution of DVBBnA in dry cyclohexane was added at once in a quantity as to give a CA:Li molar ratio of 3:1. In experiments 8 and 10, the 0.3M s-BuLi solution was added at 70° C. and 25° C., respectively. In experiment 9, a 1.0 M solution of DVBBnA in dry cyclohexane was added at once in a quantity as to give a CA:Li molar ratio of 2:1. In experiments 11 and 12, a 1.0 M solution of DVBBnA in dry cyclohexane was added at once in a quantity as to give a CA:Li molar ratio of 4.5:1 and the 0.3M s-BuLi solution was added at 25° C. and 50° C., respectively. During the coupling reaction the temperature of the vessel was raised to 80° C. for 2 h. The resulting polymers were sampled by precipitation in methanol/BHT and subjected to GPC analysis. The results and data obtained from experiments 7-12 are shown in Table 1.

As shown in Table 1, DVBBnA was used in all coupling experiments using polystyrene as the polymer blocks. Irrespective of reaction conditions, the polystyrene experiments exhibited higher coupling efficiencies (97-99%) than with polyisoprene (95%). Also, surprisingly it was found that a 33% increase in the amount of anionic polymerization initiator (Li) led to a 38% decrease in peak ratio while a 33% increase in the amount of anionic polymerization initiator at lower reaction temperatures (25° C. and 50° C.) only led to an 8-15% decrease in peak ratio indicating that the ratio of CA:Li is more important than reaction temperature with respect to the peak ratio of the formed polymer.

Also as shown in experiments 7, 9, and 10 of Table 1, an increase in reaction temperature resulted in higher monodispersity of the DVBBnA polymer samples ($M_w/M_n$=1.23 at 25° C., 1.20 at 60° C., and 1.15 at 70° C.). The average molecular weights also noticeably increased in the same fashion from 25-70° C. It has also been shown in examples 10 and 11 that an increase in CA:Li ratio almost doubles the average molecular weights of the formed polymers while the $M_w M_n$ ratio are relatively unchanged. This indicates that the average molecular weight of the polymer can be increased by adding excess coupling agent while said excess does not noticeably affect the monodispersity of the formed polymer.

Example 3

Hydrogenation of PI-DVBBnA-PI of Experiment 1

A polymer solution of PI-DVBBnA-PI (experiment 1) was prepared by dissolving the polymer in cyclohexane to form a polymer solution having approximately 10 wt. % solids content. The polymer was then hydrogenated by introducing hydrogen gas at 40 barg and a temperature of 75° C., in the presence of 150 ppm of a cobalt/aluminum catalyst. The resulting polymer solution was washed twice with a 1% citric acid solution in water at 75° C. After neutralization with aqueous ammonia and addition of 0.2 parts per hundred resin ("phr") of Irganox® 1010, the polymer was coagulated by steam coagulation and subsequently dried under vacuum at 60° C. The residual unsaturation level was determined by $^1$H-NMR at 0.07 meq/g.

2. The process of claim 1, wherein the coupling agent has the structure I:

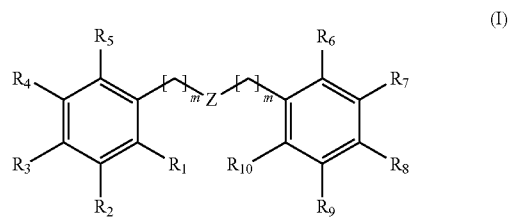

wherein

Z is an amine;

$R_1$-$R_{10}$ are each, independent of one another, H, an organic functional group, or a terminal alkene, wherein at least one terminal alkene is on each benzene ring; and m is an integer from 1 to 8, wherein the process further comprises terminating the polymerization if any living polymer segments remain after reacting with the coupling agent.

3. The process of claim 2, wherein Z is an acyclic amine.

4. The process of claim 3, wherein the acyclic amine is one of alkylamine or an arylamine.

5. The process of claim 3, wherein the acyclic amine is one of n-butyl amine or benzylamine.

6. The process of claim 2, wherein Z is a cyclic amine.

7. The process of claim 2, wherein one of the groups $R^1$-$R^5$ and one of the groups $R^6$-$R^{10}$ is a terminal alkene.

8. The process of claim 1, wherein polymerizing the monomer or the mixture of monomers is initiated in the presence of an anionic initiator.

9. The process of claim 1, wherein the monomers are selected from the group consisting of conjugated dienes, styrenes, and mixtures thereof.

TABLE 1

| Ex. | Coupling Agent | Precursor | Mn Precursor | Temp (°) | CA:Li Ratio | Solids (%) | Mw | Mn | Mw/Mn | CE (%) | LC (%) | DoB |
|---|---|---|---|---|---|---|---|---|---|---|---|---|
| 1 | DVBBnA | PI | 53 | 60 | 3 | 10 | 343 | 302 | 1.13 | 95 | 3 | 7 |
| 2 | DVBBA | PI | 20 | 60 | 3 | 10 | 193 | 168 | 1.14 | 84 | 1 | 8 |
| 3 | DVBBA | PI | 20 | 70 | 3 | 10 | 189 | 152 | 1.24 | 88 | 1 | 9 |
| 4 | DVBP | PI | 20.5 | 60 | 3 | 10 | 174 | 153 | 1.14 | 84 | 1 | 10 |
| 5 | DVBP | PI | 20.5 | 70 | 3 | 10 | 177 | 157 | 1.13 | 85 | 1 | 10 |
| 6 | DVB | PI | 55 | 60 | 3 | 10 | 340 | 320 | 1.06 | 94 | 1 | 6 |
| 7 | DVBBnA | PS | 11 | 60 | 3 | 7.5 | 140 | 117 | 1.2 | 98 | <1 | 13 |
| 8 | DVBBnA | PS | 11 | 70 | 3 | 7.5 | 167 | 148 | 1.13 | 97 | <1 | 13 |
| 9 | DVBBnA | PS | 21 | 60 | 2 | 7.5 | 167 | 148 | 1.13 | 97 | <1 | 8 |
| 10 | DVBBnA | PS | 11 | 25 | 3 | 7.5 | 82 | 67 | 1.23 | 94 | 3 | 8 |
| 11 | DVBBnA | PS | 11 | 25 | 4.5 | 7.5 | 155 | 128 | 1.21 | 97 | <1 | 11 |
| 12 | DVBBnA | PS | 11 | 50 | 4.5 | 7.5 | 179 | 157 | 1.14 | 98 | <1 | 12 |

The invention claimed is:

1. A process for coupling a polymer comprising:

polymerizing a monomer or a mixture of monomers to form polymer segments; and reacting the polymer segments with a coupling agent, the coupling agent having at least two alkenylbenzene groups each covalently bonded with a nitrogen of an amine compound.

10. The process of claim 1, further comprising hydrogenating the coupled polymer.

11. A polymer comprising a residue of a coupling agent, the coupling agent, prior to coupling, having at least two alkenylbenzene groups each covalently bonded with a nitrogen of an amine compound.

12. The polymer of claim 11, comprising the residue of a coupling agent having the structure II:

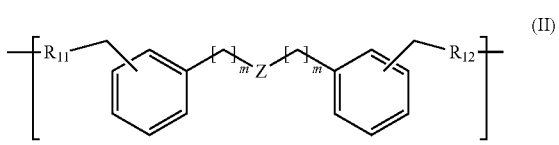

(II)

wherein
Z is an amine;
$R_{11}$ and $R_{12}$ are $C_1$-$C_7$ alkyl;
the remaining positions of each benzene ring may be substituted with one or more of H or organic functional group; and
m is an integer from 1 to 8.

13. The polymer of claim 12, comprising two polymer blocks:
  (a) block A, wherein the block A has a number average molecular weight of from about 1,000 to about 160,000; and
  (b) block A', wherein the block A' has a number average molecular weight of from about 1,000 to about 160,000,
wherein the coupling agent residue couples at least one of block A or block A', or couples block A to block A'.

14. The polymer of claim 13, having the general configuration A-X-A', A-X-A'-X-A, A'-X-A-X-A', $(A-A')_nX$, $(A-A'-A)_nX$, $(A'-A-A')_nX$ or mixtures thereof, wherein X is the coupling agent reside of formula II, n is an integer from 2 to 30, and wherein the blocks A and blocks A' are the same or different.

15. The polymer of claim 13, wherein each block A and each block A' is polymerized from monomers selected, independently of one another, from the group consisting of conjugated dienes, monoalkenyl arenes, and mixtures thereof.

16. The polymer of claim 12, wherein $R_{11}$ and $R_{12}$ are each $C_1$.

17. The polymer of claim 12, wherein m is 1.

18. The polymer of claim 12, wherein Z is an acyclic amine.

19. The polymer of claim 12, wherein the acyclic amine is one of alkylamine or an arylamine.

20. The polymer of claim 12, wherein the acyclic amine is one of n-butyl amine or benzylamine.

21. The polymer of claim 12, wherein Z is a cyclic amine.

22. The polymer of claim 12, wherein the polymer is hydrogenated.

23. A process for forming a polymer comprising:
  reacting a coupling agent, having at least two alkenylbenzene groups each covalently bonded with a nitrogen of an amine compound, with an initiator to form a living coupling agent with a reactive polymerization site;
  reacting the reactive polymerization site with a monomer or mixtures of monomers; and
  polymerizing the a monomer or mixtures of monomers to form polymer segments extending from the coupling agent.

24. The process of claim 23, wherein the polymerizing of the monomer or mixture of monomers is conducted in the presence of an anionic initiator.

25. The process of claim 23, wherein the coupling agent has the structure I:

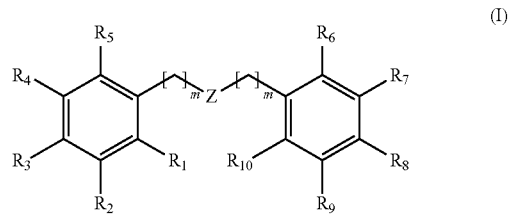

(I)

wherein
Z is an amine;
$R_1$-$R_{10}$ are each, independent of one another, H, an organic functional group, or a terminal alkene, wherein at least one terminal alkene is on each benzene ring; and
m is an integer from 1 to 8,
wherein the process further comprises terminating the polymerization if any living polymer segments remain after polymerization.

26. The process of claim 25, wherein Z is an acyclic amine.

27. The process of claim 26, wherein the acyclic amine is one of alkylamine or an arylamine.

28. The process of claim 26, wherein the acyclic amine is one of n-butyl amine or benzylamine.

29. The process of claim 25, wherein Z is a cyclic amine.

30. The process of claim 25, wherein one of the groups $R^1$-$R^5$ and one of the groups $R^6$-$R^{10}$ is a terminal alkene.

31. The process of claim 23, wherein the monomer or mixtures of monomers are selected from the group consisting of conjugated dienes, styrenes, and mixtures thereof.

32. The process of claim 23, wherein the monomer or mixtures of monomers are selected from the group consisting of isoprene, butadiene, and mixtures thereof.

33. The process of claim 23, further comprising hydrogenating the coupled polymer.

34. The process of claim 23, wherein an excess amount of coupling agent is reacted with the initiator, to form a multifunctional core comprising a plurality of polymerized or cross-linked coupling agent molecules.

* * * * *

UNITED STATES PATENT AND TRADEMARK OFFICE
CERTIFICATE OF CORRECTION

PATENT NO. : 9,834,625 B2  
APPLICATION NO. : 14/826724  
DATED : December 5, 2017  
INVENTOR(S) : Adrie A. van der Huizen and Carl L. Willis Page 1 of 1

It is certified that error appears in the above-identified patent and that said Letters Patent is hereby corrected as shown below:

In the Claims

In Column 18, Line 35, delete:
"$R^1$-$R^5$ and one of the groups $R^6$-$R^{10}$ is a terminal alkene."
And replace with:
$R_1$-$R_5$ and one of the groups $R_6$-$R_{10}$ is a terminal alkene.

In Column 20, Line 40, delete:
"$R^1$-$R^5$ and one of the groups $R^6$-$R^{10}$ is a terminal alkene."
And replace with:
$R_1$-$R_5$ and one of the groups $R_6$-$R_{10}$ is a terminal alkene.

Signed and Sealed this  
Thirteenth Day of November, 2018

Andrei Iancu  
*Director of the United States Patent and Trademark Office*